(12) United States Patent
Sofka et al.

(10) Patent No.: US 7,711,161 B2
(45) Date of Patent: May 4, 2010

(54) VALIDATION SCHEME FOR COMPOSING MAGNETIC RESONANCE IMAGES (MRI)

(75) Inventors: Michal Sofka, Troy, NY (US); Li Zhang, Skillman, NJ (US); Ulf Schäfer, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 719 days.

(21) Appl. No.: 11/204,790

(22) Filed: Aug. 16, 2005

(65) Prior Publication Data

US 2006/0047197 A1   Mar. 2, 2006

Related U.S. Application Data

(60) Provisional application No. 60/604,105, filed on Aug. 24, 2004.

(51) Int. Cl.
*G06K 9/00* (2006.01)

(52) U.S. Cl. .................................................. 382/128

(58) Field of Classification Search ................. 382/100, 382/128–134, 276, 293, 294; 128/920–930; 250/455–465; 356/39–49; 600/407, 408, 600/409, 410, 411, 412, 413, 414, 424, 425, 600/426
See application file for complete search history.

(56) References Cited

U.S. PATENT DOCUMENTS

| | | | | |
|---|---|---|---|---|
| 5,613,013 | A * | 3/1997 | Schuette | 382/124 |
| 5,956,418 | A * | 9/1999 | Aiger et al. | 382/154 |
| 2005/0111758 | A1 * | 5/2005 | Lange et al. | 382/294 |
| 2006/0165267 | A1 * | 7/2006 | Wyman et al. | 382/128 |

* cited by examiner

*Primary Examiner*—Samir A Ahmed
*Assistant Examiner*—Atiba O Fitzpatrick
(74) *Attorney, Agent, or Firm*—Donald B. Paschburg

(57) ABSTRACT

Method and apparatus for determining the quality of alignment of a pair of volumes of data of medical images is disclosed. The method for validating the alignment includes selecting one or more points in the first volume and one or more points in the second volume, determining the average distance between the one or more points in the first volume and the one or more points in the second volume, determining a distortion category based on the average distance, determining an average noise level in the first and second volumes, and assigning a Q value indicative of the quality of the alignment based on the distortion category.

18 Claims, 7 Drawing Sheets

| Distortion | Noise | Q-value |
|---|---|---|
| Severe | High | 48 |
| Severe | Medium | 52 |
| Severe | Moderate | 56 |
| Severe | Low | 60 |
| Medium | High | 60 |
| Medium | Medium | 64 |
| Medium | Moderate | 68 |
| Medium | Low | 72 |
| Moderate | High | 72 |
| Moderate | Medium | 76 |
| Moderate | Moderate | 80 |
| Moderate | Low | 84 |
| Minimal | High | 84 |
| Minimal | Medium | 88 |
| Minimal | Moderate | 92 |
| Minimal | Low | 96+ |

- The volume pair will have a high Q-value if distortion and noise are low, but can have a very low value if the distortion is high
- The influence of distortion is higher than the influence of noise
- Drop down in one noise category will decrease Q-value by 4
- Drop down in one distortion category will decrease Q-value by 12

*Q-values of good alignments with different noise level and distortion.*

FIG 2. Selected landmark points (middle panel), estimating noise from the background (left panel) and computing values (right panel).

FIG. 3

| HIGH | MEDIUM | MODERATE | LOW |
|---|---|---|---|

| SEVERE | MEDIUM | MODERATE | MINIMAL |
|---|---|---|---|

16.00　　　　　12.00　　　　　8.00　　　　　4.00　　　　　0.00

| Distortion | Noise | Q-value |
|---|---|---|
| Severe | High | 48 |
| Severe | Medium | 52 |
| Severe | Moderate | 56 |
| Severe | Low | 60 |
| Medium | High | 60 |
| Medium | Medium | 64 |
| Medium | Moderate | 68 |
| Medium | Low | 72 |
| Moderate | High | 72 |
| Moderate | Medium | 76 |
| Moderate | Moderate | 80 |
| Moderate | Low | 84 |
| Minimal | High | 84 |
| Minimal | Medium | 88 |
| Minimal | Moderate | 92 |
| Minimal | Low | 96+ |

- The volume pair will have a high Q-value if distortion and noise are low, but can have a very low value if the distortion is high

- The influence of distortion is higher than the influence of noise
- Drop down in one noise category will decrease Q-value by 4

- Drop down in one distortion category will decrease Q-value by 12

FIG. 5. Q-values of good alignments with different noise level and distortion.

FIG. 6

| unit: mm | Absolute dist. from the manual alignments | | | Euclidean | $E_{align}$ |
|---|---|---|---|---|---|
| | H | V | D | | |
| Automatic vs. consensus | 0.84 | 1.81 | 1.19 | 2.82 | 2.66 |

*FIG. 7. Q-value reflects the alignment error with respect to the amount of distortion and noise level. It is divided by 10 for this plot.*

VALIDATION SCHEME FOR COMPOSING
MAGNETIC RESONANCE IMAGES (MRI)

CROSS-REFERENCE TO RELATED
APPLICATIONS

This application claims the benefit of U.S. Provisional Application No. 60/604,105, filed Aug. 24, 2004, which is incorporated herein by reference.

BACKGROUND OF THE INVENTION

It is now common to generate multiple volumes of image data during a magnetic resonance imaging procedure on a patient. Other medical imaging procedures on a patient also generate multiple volumes.

When analyzing the volumes to generate an image of the patient, it becomes necessary to align adjacent volumes. This is a difficult task to perform. It generally requires analyzing a pair of volumes and determining the optimal way to align the volumes based on the analysis.

It is possible to visually tell whether volumes are well aligned by examining the resulting photo. For example, if a visual inspection of the image shows that structures, such as bones or blood vessels align, then the alignment would be deemed good. On the other hand, if the visual examination shows that the structures do not align, then the alignment would be deemed bad.

The visual inspection, however, has its limitations. For example, it is time consuming. It also requires one or more persons to examine a plurality of different alignments to judge which are acceptable. The visual inspection is also subject to the inspector's objectivity. Furthermore, it is difficult for a inspector to determine an optimal alignment in a three dimensional setting, such as MR volumes.

Thus, new and improved method and systems to judge the quality of the alignment of volume pairs is needed.

SUMMARY OF THE INVENTION

In accordance with one aspect of the present invention, a method for validating the alignment of a plurality of volumes of image data obtained during a medical imaging procedure is provided. The method includes selecting one or more points in a first volume and one or more points in a second volume and then determining the average Euclidean distance between the one or more points in the first volume and the one or more points in the second volume. Then a distortion category is determined based on the average Euclidean distance, and a quality value (a Q value) indicative of the quality of the alignment of the first volume and the second volume is assigned based on the distortion category.

In accordance with a further aspect of the present invention, the distortion category is based on the average Euclidean distance as follows: if the average Euclidean distance is between 12 and 16, the distortion category is Severe; if the average Euclidean distance is between 8 and 12, the distortion category is Medium; if the average Euclidean distance is between 4 and 8, the distortion category is Moderate; if the average Euclidean distance is between 0 and 4, the distortion category is Minimal.

In accordance with another aspect of the present invention, a noise level from a background region in the first volume is determined and a noise level from a background region in the second volume is determined. The average of the two noise levels is determined, and a Q value indicative of the quality of the alignment based on the distortion category and on the average noise level is determined.

In accordance with another aspect of the present invention, a system for validating the alignment of datasets obtained during a medical imaging procedure is also provided. The system includes means for determining the average Euclidean distance between one or more points in a first volume and one or more points in a second volume and means for determining a distortion category based on the average Euclidean distance. It also includes means for determining the noise level of an area of the first volume and the second volume and for determining the average noise level. The system determines the Q value based on the distortion category and the noise level.

DESCRIPTION OF THE DRAWINGS

FIG. 3 illustrates range values for noise level bins in accordance with one aspect of the present invention.

FIG. 4 illustrates range values for distortion amount bins in accordance with one aspect of the present invention.

FIG. 5 illustrates a table that can be used to determine Q values based on noise levels and distortion amounts in accordance with one aspect of the present invention.

FIGS. 6 and 7. illustrate results obtained in accordance with the present invention.

DESCRIPTION OF THE PREFERRED
EMBODIMENT

This patent application describes a performance evaluation scheme of the MR composer application, which is used to align pairs of volumes obtained from a magnetic resonance imaging machine. Thus present invention provides a measure of a quality of the alignment of a pair of volumes by way of a Q value. The method and system of the present invention, however, is useful in a wide range of medical imaging applications.

A set of volumes obtained during acquisition is aligned to produce a single compact image. It is preferred to quantify how good the alignment is in the best possible manner. It is preferred to quantify the resulting alignment despite the fact that the true gold standard for the data sets is not available. The method of the present invention can be used in volume alignment processes or other processes designed to solve similar problems to find out whether the proposed changes improve the performance or not.

In accordance with one aspect of the present invention, a quality value (Q-value) is determined by the process of the present invention to characterize the quality of alignment parameters. It is very difficult to design a process that would automatically compute such a value that would be equal to the one assigned by a human observer who is judging the noise, distortion and alignment precision.

The main purpose of the present method is to answer two questions. The first question is how good is the alignment produced by the MR composer? The second question is does the Q-value reflect the quality of composing?

Figure 1:
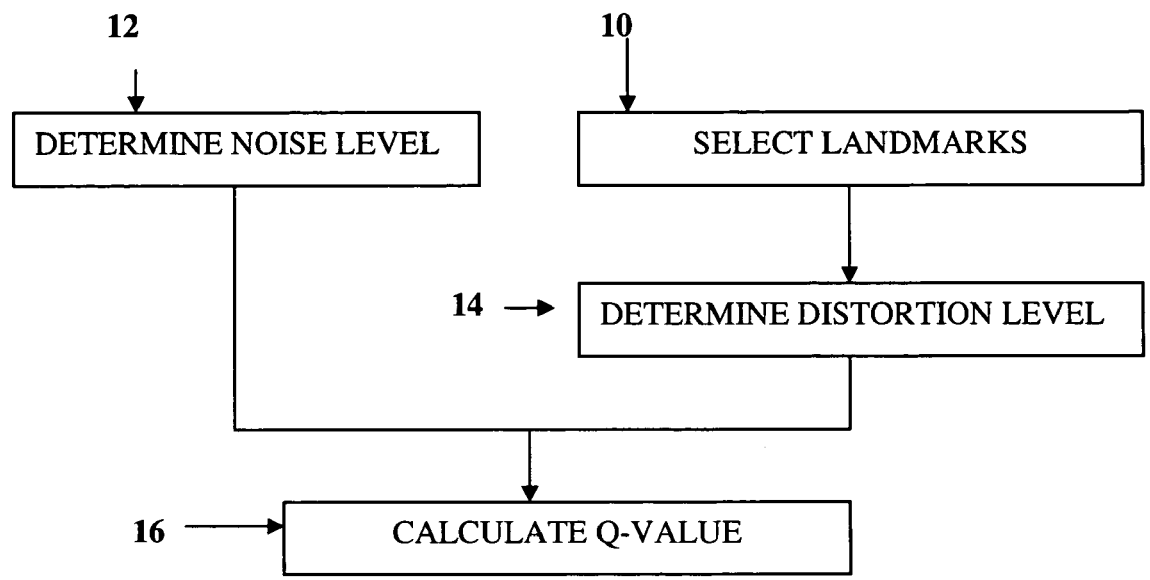
FIG. 1 illustrates a flow diagram of the method in accordance with one aspect of the present invention.

FIG. 1 illustrates the steps of a preferred embodiment of the present invention. In step 10, one or more points in a first image are selected and one or more points in a second image are selected. These points can be selected manually or automatically by a processor. The points are preferably selected at a readily identifiable landmark on the images. In step 12, a noise level of the background in each image is determined and an average of the noise level is obtained. In step 14, the distortion between the two images is determined by determining the average Euclidean distance between the landmark points. In step 16, a Q value is determined based on the average noise level and on the distortion level. The Q level indicates the quality of the alignment.

Figure 2:
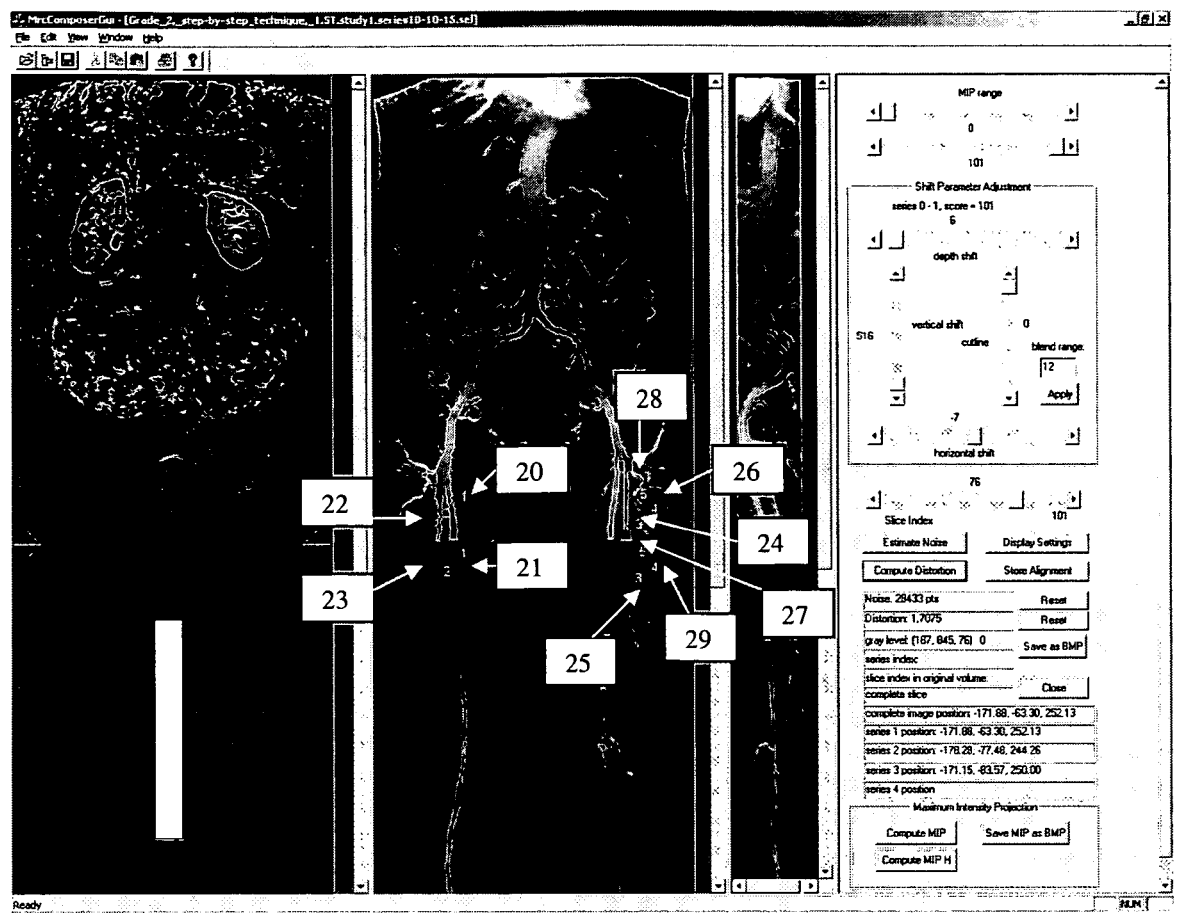
FIG. 2 illustrates a window screen showing selected landmarks and the calculation of noise levels and distortion levels in accordance with one aspect of the present invention.

Referring to FIG. 2, the selection of landmarks is illustrated. The middle pane of FIG. 2 shows a landmark 1 at position 20 in the top image and at position 21 in the lower image. It also shows a landmark 2 at position 22 in the top image and at position 23 in the lower image, a landmark 3 at position 24 in the top image and at position 25 in the lower image, a landmark 4 at position 26 in the top image and at position 27 in the lower image and a landmark 5 at position 28 in the top image and at position 29 in the lower image.

The landmarks can be selected manually or automatically via a software program in a processor. The landmarks are chosen as prominent feature points, such as vessel bifurcation points, points with maximum curvature, etc. The landmarks should be picked as precisely as possible and the Microsoft Windows Magnifier (Start→Programs→Accessories→Accessibility→Magnifier) with 8 times magnification can be used to position the landmark with a pixel accuracy.

The noise level is computed from a selected background region. The selected, background region may be user selected (drag and drop to outline a window) of N points, by estimating scale of an underlying Rice distribution. In this region, the deterministic signal is assumed to be zero and the noise level is determined as:

$$\hat{\sigma}^2 = \frac{1}{KN} \sum_{i=1}^{N} M_i^2$$

Where K denotes twice the number of orthogonal Cartesian directions in which flow is encoded (equal to 2 for 2D slices—a single gradient selects slice and the values of kx, ky, in the k-space are filled; it is multiplied by the number of coils, $M_i$ are signal magnitudes that follow generalized Rice distribution. Typically, around N=50,000 points are collected across the whole volume. In regions, where the signal is zero, the magnitude data is governed by a generalized Rayleigh distribution. For large signal magnitudes (SNR→∞) the Rice distribution approaches a shifted Gaussian distribution centered at r=sigma The noise level for two aligned volumes is determined in this fashion. Then, the average of noise levels of two volumes in each volume pair is used as the noise level of this volume pair. The noise level of each volume pair is grouped into four categories: LOW, MODERATE, MEDIUM, and HIGH, depending on the quantity of noise, as shown in FIG. 3. The threshold values for the bins illustrated in FIG. 3 have been determined experimentally for one system, such that a LOW noise level falls within the range of 0.0 to 0.65, a MODERATE noise level falls within the range of 0.65 to 1.30, a MEDIUM noise level falls within the range of 1.30 to 1.95 and a HIGH noise level falls within the range of 1.95 to 2.6.

Distortion can be calculated before or after the noise calculation. Distortion is computed as the average distance between corresponding pairs of the previously described landmark points, as illustrated in FIG. 2. In a preferred embodiment of the present invention, five pairs of landmarks are used, two selected on one side of the image and three on the other. This allows the method to capture the amount of distortion across the whole image. In exceptional situations less landmark points can be used.

The image distortion of each volume pair is grouped into four categories: MINIMAL, MODERATE, MEDIUM, and SEVERE. Let $(h_i, v_i, d_i)$ be the alignment parameters obtained from landmark point $P_i$, where $1 \leq i \leq n$, n is the number of landmark pairs selected from the volume pair, n=5 in a preferred embodiment of the present invention. Then the assignment of categories is determined as follows:

$$\begin{cases} \max(h_{distor}, v_{distor}) < 4 & \text{Minimal} \\ 4 \leq \max(h_{distor}, v_{distor}) < 8 & \text{Moderate} \\ 8 \leq \max(h_{distor}, v_{distor}) < 12 & \text{Medium} \\ 12 < \max(h_{distor}, v_{distor}) & \text{Severe} \end{cases}$$

where $$h_{distor} = \frac{1}{5} \sum_{n=1}^{5} (h_i - h_{mean})$$

$$v_{distor} = \frac{1}{5} \sum_{n=1}^{5} (v_i - v_{mean})$$

and $$h_{mean} = \frac{1}{5} \sum_{n=1}^{5} h_i$$

$$v_{mean} = \frac{1}{5} \sum_{n=1}^{5} v_i$$

This function selected the maximum value of the parameters. Thus, when both $h_{distor}$ and $v_{distor}$ are less than 4, the MINIMAL distortion category is selected. Similarly, when the maximum value of these two parameters is between 4 and 8, the MODERATE distortion level is selected.

Note that only horizontal and vertical directions are used in accordance with this aspect of the invention. This is preferred due to the low resolution in the depth direction. This value is enough to classify the distortion into the four categories well. The category bins are illustrated in FIG. 4. The threshold values for the bins were derived from the experimental data.

In the next step, the noise level and the distortion level are used to determine the Q value. To do so, the noise level category determined in the previous step and the distortion level category determined in the previous step are used to reference a table illustrated in FIG. 5. Based on the input noise level and distortion level, a Q value is determined.

In general, Q values approaching 100 mean the composed result is very good. In these cases, it is almost not possible to tell where the seam is. On the other hand, values below 50 indicate a serious misalignment and are not acceptable. Further, manual alignment of two corresponding volumes should never have a value smaller than 48, because manual alignment provides the ideal result which should be accepted. Also, a value of 96 or above indicates perfect alignment of clean images (noise level="MINIMAL") with no distortion (distortion="MINIMAL")

It is also noted that noise does not affect the alignment quality as much as distortion. Image distortion and noise are the main reasons for a decrease of the Q-value. When the optimal alignment is provided by observers, Q-value (used as a ground truth) can be defined based on noise level and image distortion unambiguously as shown in FIG. 5.

The performance of the method has been analyzed. Let $(h_1,v_1,d_1)$ and $(h_2,v_2,d_2)$ be the lower and upper bound of the range of good alignments obtained from observers, and $(h_c, v_c,d_c)$ be the alignment calculated by the composer, then the misalignment error $E_{align}$ can be computed as $$E_{align} = \omega_h \min(|h_1 - h_c|, |h_2 - h_c|) + \qquad \text{Equation 1}$$
$$\omega_v \min(|v_1 - v_c|, |v_2 - v_c|) + \omega_d \min(|d_1 - d_c|, |d_2 - d_c|)$$

where $$\begin{cases} \omega_h = 1 & \\ \omega_v = 1 & \text{spine composing} \\ \omega_d = Z_{resolution} / XY_{resolution} & \\ \omega_h = 1 & \\ \omega_v = 5/8 & \text{peripheral angio composing} \\ \omega_d = Z_{resolution} / XY_{resolution} & \\ \omega_h = 1 & \\ \omega_v = 1 & \text{whole body angio composing} \\ \omega_d = Z_{resolution} / XY_{resolution} & \end{cases}$$

Note that the usage of the range of good alignments, not a single value, compensates the influence of image distortion in the alignment error calculation.

The estimated Q-value $\hat{Q}$ for the automatically calculated alignment can be computed as $$\hat{Q} = Q_g - 8 * E\, E_{align},$$

where $Q_g$ is the Q-value for good alignments of this volume pair based on noise and distortion (from Table 1). Let $Q_c$ be the Q-value calculated by the composer, then the Q-value error is $$E_Q = Q_c - \hat{Q}.$$

This proposed evaluation scheme was used to study results of 12 MRA (MR angiography) patient series, a total of 31 aligned volume pairs. Average alignment errors are summarized in FIG. 6. FIG. 6 shows the absolute distances between automatic and manual alignments in all directions were calculated using the evaluation scheme with ranges described in the previous section. Euclidean distance was computed from these directions. Total alignment error $E_{align}$ was calculated by Equation 1.

Figure 7:
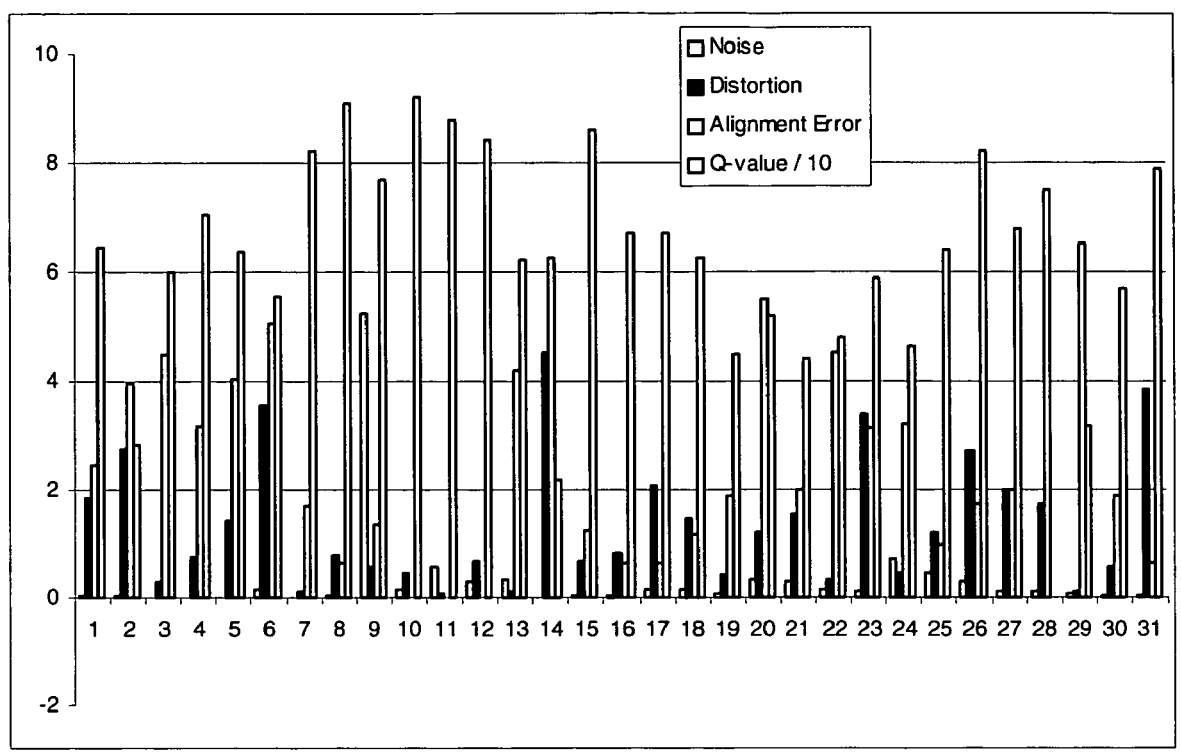

The Q-value with respect to noise and distortion measurements is plotted in FIG. 7. It has the desired i.e. it reflects the quality of alignment with respect to the noise, amount of distortion and error. The evaluation scheme is particularly useful for comparing performance of different algorithms or two different versions of the same algorithm. In FIG. 7, Q value reflects the alignment error with respect to the amount of distortion and noise level. It is divided by 10 in this plot.

Figure 8:
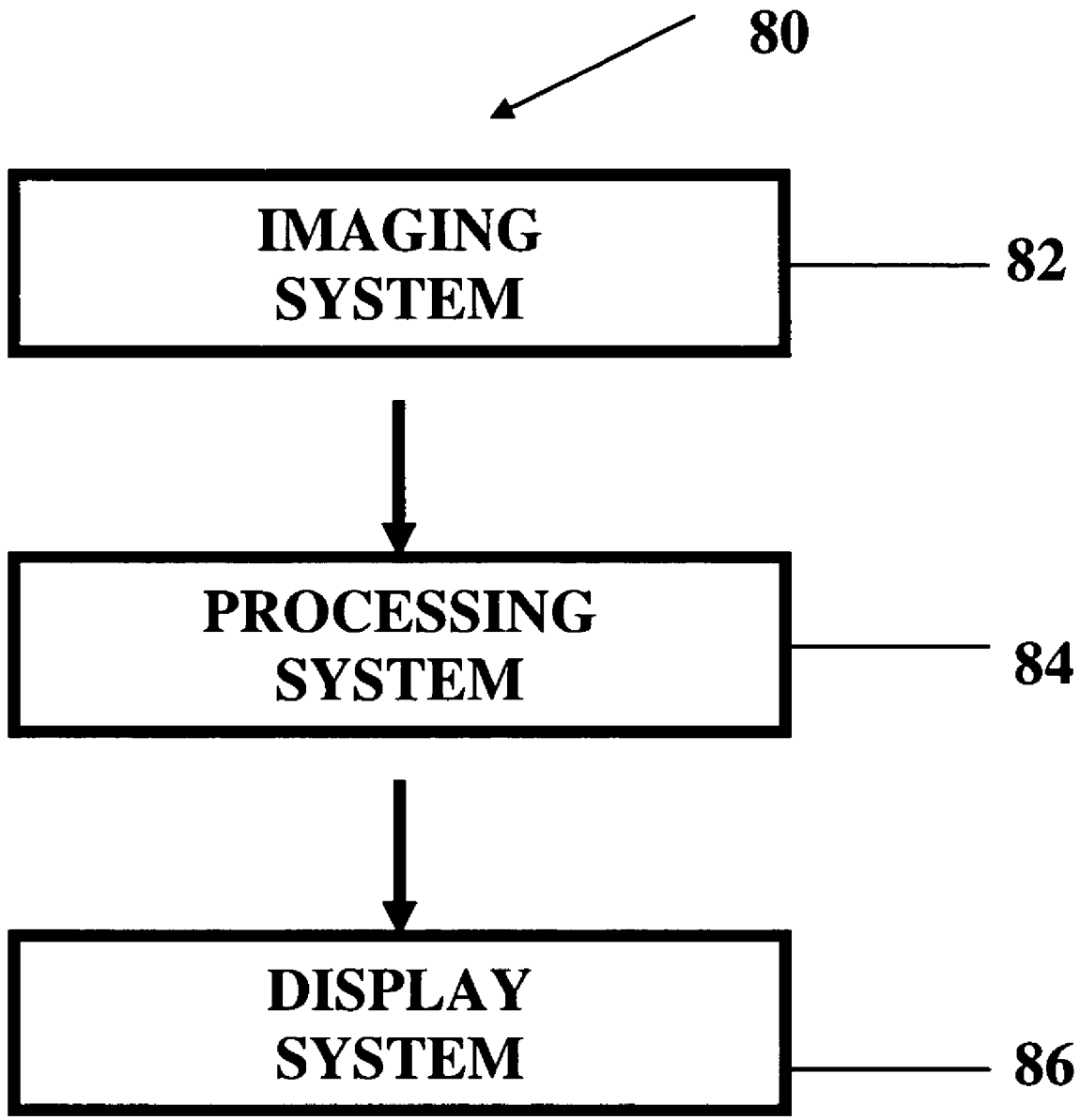
FIG. 8 illustrates a system in accordance with one aspect of the present invention.

FIG. 8 illustrates a medical imaging system 80. The system 80 includes an imaging device 82, a processor 84 and a display 86. The imaging device 80 is a magnetic resonance imaging machine, by way of example only. The processor 84 is a personal computer, workstation or the like, that can be connected to the imaging device 80 or a stand-alone machine. The processor 84 can also be a multi-processor system. The processor 84 performs the steps described herein.

To determine how well the Q level indicates the quality of alignment, it is desirable to obtain the gold standard for the alignment and Q-value. This is done manually with two observers and a panel (the two observers and a moderator) participating in the evaluation. Horizontal, vertical, and depth alignment and Q-value from the software alignment composer are recorded for evaluation. Using guidelines described below, noise level and distortion (including MR reconstruction distortion and patient movement) are determined by observers and used for calculating the Q-value that will serve as the ground truth for the Q-value validation.

The determination of the quality of alignment by the observers follows certain general rules. First, each observer is shown the volumes/pairs in a random order. Second, all available volumes from a series are composed at once. This way all volumes get equalized to the maximum resolution out of all in the given series.

Manual alignments are determined from MIP images at first, but the original volumes are checked each time. MIP images are displayed without overlapping (so that observers would not be biased by a displayed alignment). XY MIP images are used to determine the initial horizontal and vertical shift, YZ MIP images are used to determine the depth shift. Precise alignments are determined with the help of landmark points. Landmarks are chosen as prominent feature points, such as vessel bifurcation points, points with maximum curvature, etc. Landmarks are picked as precisely as possible and the Microsoft Windows Magnifier (Start→Programs→Accessories→Accessibility→Magnifier) with 8 times magnification is used to position the landmark with a pixel accuracy. The clarity of the MIP images is improved by adjusting the slice ranges across which MIP is computed. The observers constantly refer back to the original images, in order to verify the decisions made based on the MIP images. The observers validate alignment in MIPS by moving cutline in the overlap region.

In general, if the horizontal or depth alignment values differ by one or more, two observers need to re-evaluate the results. Also, if the vertical alignment values differ by two or more, two observers need to re-evaluate results. If an agreement cannot be made, the case needs to be discussed in a panel. The image quality (noise and distortion) indicators must be agreed on precisely. If the categories differ, two observers need to re-evaluate results. If an agreement cannot be made the case is discussed in the panel. The Q-value will have the same value for both observers determined by the image quality categories.

While the method has been described using distortion and noise level to determine the Q-value, it is possible to determine Q value using just the distortion level or just the noise level as well. Further, the method has been described using an average of the noise levels, but the method can be followed using a single noise level, without having to determine an average.

Although the invention herein has been described with reference to particular embodiments, it is to be understood that these embodiments are merely illustrative of the principles and applications of the present invention. It will be apparent to those skilled in the art that various modifications and variations can be made to the method of the present invention without departing from the spirit and scope of the invention. Thus, it is intended that the present invention include modifications and variations that are within the scope of the appended claims and their equivalents.

The invention claimed is:

1. A method for validating an alignment of a first and second volume of data obtained during a medical imaging procedure, comprising the steps of:
   selecting one or more points in the first volume and one or more points in the second volume;
   determining an average Euclidean distance between the one or more points in the first volume and the one or more points in the second volume;
   determining a distorted alignment category that provides a quantitative measure of alignment based on the average Euclidean distance; and
   assigning a Q value indicative of a quality of the alignment based on the distorted alignment category, the steps being carried out by a processor for medical imaging, wherein the distorted alignment category is based on the average Euclidean distance as follows: if the average Euclidean distance is between 12 and 16, the distorted alignment category is Severe; if the average Euclidean distance is between 8 and 12, the distorted alignment category is Medium; if the average Euclidean distance is between 4 and 8, the distorted alignment category is moderate; if the average Euclidean distance is between 0 and 4, the distorted alignment category is Minimal.

2. The method as claimed in claim 1, wherein there is a plurality of points selected in the first volume.

3. The method as claimed in claim 2, wherein there is a plurality of points selected in the second volume.

4. The method as claimed in claim 1, wherein a single point is selected in the first volume and a single point is selected in the second volume, and the average Euclidean distance is the Euclidean distance between the single point in the first volume and the single point in the second volume.

5. The method as claimed in claim 1, further comprising determining a noise level from a background region in the first volume and assigning a Q value indicative of the quality of the alignment based on the distorted alignment category and on the noise level.

6. The method as claimed in claim 5, wherein the Q value is determined in accordance with the following table:

| Distortion | Noise | Q |
| --- | --- | --- |
| Severe | Severe | 48 |
| Severe | Medium | 52 |
| Severe | Moderate | 56 |
| Severe | Minimal | 60 |
| Medium | Severe | 60 |
| Medium | Medium | 64 |
| Medium | Moderate | 68 |
| Medium | Minimal | 72 |
| Moderate | Severe | 72 |
| Moderate | Medium | 76 |
| Moderate | Moderate | 80 |
| Moderate | Minimal | 84 |
| Minimal | Severe | 84 |
| Minimal | Medium | 88 |
| Minimal | Moderate | 92 |
| Minimal | Minimal | 96. |

7. The method as claimed in claim 1, further comprising:
   determining a noise level from a background region in the first volume;
   determining a noise level from a background region in the second volume;
   determining an average of the noise level from the background region in the first volume and the noise level from the background region in the second volume; and
   assigning a Q value indicative of the quality of the alignment based on the distorted alignment category and on the average noise level.

8. The method as claimed in claim 7, further comprising determining a Q value for a plurality of pairs of volumes.

9. A system for validating an alignment of a first and second volume of data obtained during a medical imaging procedure, comprising:
   an imaging device;
   a processor for selecting one or more points in the first volume and one or more points in the second volume;
   a processor for determining an average Euclidean distance between the one or more points in the first volume and the one or more points in the second volume;
   a processor for determining a distorted alignment category that provides a quantitative measure of alignment based on the average Euclidean distance; and
   a processor for assigning a Q value indicative of a quality of the alignment based on the distorted alignment category, wherein the distorted alignment category is based on the average Euclidean distance as follows: if the average Euclidean distance is between 12 and 16, the distorted alignment category is Severe; if the average Euclidean distance is between 8 and 12, the distorted alignment category is Medium; if the average Euclidean distance is between 4 and 8, the distorted alignment category is Moderate; if the average Euclidean distance is between 0 and 4, the distorted alignment category is Minimal.

10. The system as claimed in claim 9, wherein there is a plurality of points selected in the first volume.

11. The system as claimed in claim 10, wherein there is a plurality of points selected in the second volume.

12. The system as claimed in claim 9, wherein a single point is selected in the first volume and a single point is selected in the second volume, and the average Euclidean distance is the Euclidean distance between the single point in the first volume and the single point in the second volume.

13. The system as claimed in claim 9, further comprising means for determining a noise level from a background region in the first volume and assigning a Q value indicative of the quality of the alignment based on the distorted alignment category and on the noise level.

14. The system as claimed in claim 13, wherein the Q value is determined in accordance with the following table:

| Distortion | Noise | Q |
| --- | --- | --- |
| Severe | Severe | 48 |
| Severe | Medium | 52 |
| Severe | Moderate | 56 |
| Severe | Minimal | 60 |
| Medium | Severe | 60 |
| Medium | Medium | 64 |
| Medium | Moderate | 68 |
| Medium | Minimal | 72 |
| Moderate | Severe | 72 |
| Moderate | Medium | 76 |
| Moderate | Moderate | 80 |
| Moderate | Minimal | 84 |
| Minimal | Severe | 84 |
| Minimal | Medium | 88 |
| Minimal | Moderate | 92 |
| Minimal | Minimal | 96. |

15. The system as claimed in claim 9, further comprising:
means for determining a noise level from a background region in the first volume;
means for determining a noise level from a background region in the second volume;
means for determining an average of the noise level from the background region in the first volume and the noise level from the background region in the second volume; and
means for assigning a Q value indicative of the quality of the alignment based on the distorted alignment category and on the average noise level.

16. The system as claimed in claim 15, further comprising determining a Q value for a plurality of pairs of volumes.

17. A method for validating an alignment of a first and second volume of data obtained during a medical imaging procedure, comprising the steps of:
selecting one or more points in the first volume and one or more points in the second volume;
determining an average distance between the one or more points in the first volume and the one or more points in the second volume;
determining a distortion category based on the average distance;
determining a noise level from a background region in the first volume and assigning a Q value indicative of a quality of the alignment based on the distortion category and on the noise level, the steps being carried out by a processor for medical imaging, and wherein
the distortion category is based on the average distance as follows: if the average distance is between 12 and 16, the distorted alignment category is Severe; if the average distance is between 8 and 12, the distortion category is Medium; if the average distance is between 4 and 8, the distortion category is Moderate; if the average distance is between 0 and 4, the distortion category is Minimal, wherein the noise level is categorized as Severe, Medium, Moderate or Minimal, and the Q value is determined in accordance with the following table:

| Distortion | Noise | Q |
| --- | --- | --- |
| Severe | Severe | 48 |
| Severe | Medium | 52 |
| Severe | Moderate | 56 |
| Severe | Minimal | 60 |
| Medium | Severe | 60 |
| Medium | Medium | 64 |
| Medium | Moderate | 68 |
| Medium | Minimal | 72 |
| Moderate | Severe | 72 |
| Moderate | Medium | 76 |
| Moderate | Moderate | 80 |
| Moderate | Minimal | 84 |

-continued

| Distortion | Noise | Q |
| --- | --- | --- |
| Minimal | Severe | 84 |
| Minimal | Medium | 88 |
| Minimal | Moderate | 92 |
| Minimal | Minimal | 96. |

18. A system for validating an alignment of a first and second volume of data obtained during a medical imaging procedure, comprising:
a processor for selecting one or more points in the first volume and one or more points in the second volume;
a processor for determining an average distance between the one or more points in the first volume and the one or more points in the second volume;
a processor for determining a distortion category based on the average distance;
a processor for determining a noise level from a background region in the first volume and assigning a Q value indicative of a quality of the alignment based on the distortion category and on the noise level, and wherein
the distortion category is based on the average distance as follows: if the average distance is between 12 and 16, the distorted alignment category is Severe; if the average distance is between 8 and 12, the distortion category is Medium; if the average distance is between 4 and 8, the distortion category is Moderate; if the average distance is between 0 and 4, the distortion category is Minimal, wherein the noise level is categorized as Severe, Medium, Moderate or Minimal, and the Q value is determined in accordance with the following table:

| Distortion | Noise | Q |
| --- | --- | --- |
| Severe | Severe | 48 |
| Severe | Medium | 52 |
| Severe | Moderate | 56 |
| Severe | Minimal | 60 |
| Medium | Severe | 60 |
| Medium | Medium | 64 |
| Medium | Moderate | 68 |
| Medium | Minimal | 72 |
| Moderate | Severe | 72 |
| Moderate | Medium | 76 |
| Moderate | Moderate | 80 |
| Moderate | Minimal | 84 |
| Minimal | Severe | 84 |
| Minimal | Medium | 88 |
| Minimal | Moderate | 92 |
| Minimal | Minimal | 96. |

* * * * *